US012634490B2

(12) United States Patent
Handford et al.

(10) Patent No.: US 12,634,490 B2
(45) Date of Patent: May 19, 2026

(54) DECODING A VIDEO STREAM ON A CLIENT DEVICE

(71) Applicant: V-NOVA INTERNATIONAL LIMITED, London (GB)

(72) Inventors: David Handford, London (GB); Farzad Sharbafian, London (GB); Daniele Sparano, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 74 days.

(21) Appl. No.: 18/254,370

(22) PCT Filed: Nov. 26, 2021

(86) PCT No.: PCT/GB2021/053076
§ 371 (c)(1),
(2) Date: May 24, 2023

(87) PCT Pub. No.: WO2022/112780
PCT Pub. Date: Jun. 2, 2022

(65) Prior Publication Data
US 2024/0022743 A1     Jan. 18, 2024

(30) Foreign Application Priority Data

Nov. 27, 2020     (GB) ...................................... 2018743

(51) Int. Cl.
*H04N 21/443*          (2011.01)
*H04N 19/30*          (2014.01)

(52) U.S. Cl.
CPC ........... *H04N 19/30* (2014.11); *H04N 21/443* (2013.01)

(58) Field of Classification Search
CPC ...... H04N 19/30; H04N 21/443; H04N 19/33; H04N 19/42; H04N 21/440227; H04N 21/41407; H04N 21/8173; G06F 9/445
(Continued)

(56) References Cited

U.S. PATENT DOCUMENTS

| | | |
|---|---|---|
| 2004/0156613 A1 | 8/2004 | Hempel et al. |
| 2005/0091526 A1* | 4/2005 | Alkove ................. H04L 63/102 726/26 |

(Continued)

FOREIGN PATENT DOCUMENTS

| | | |
|---|---|---|
| CN | 111210496 A | 5/2020 |
| JP | 2015-526017 A | 9/2015 |

(Continued)

OTHER PUBLICATIONS

International Preliminary Report on Patentability received for PCT Patent Application No. PCT/GB2021/053076, mailed on Jun. 8, 2023, 08 pages.

(Continued)

*Primary Examiner* — Tat C Chio
*Assistant Examiner* — Mahmoud Kamal Abouzahra
(74) *Attorney, Agent, or Firm* — Workman Nydegger

(57)          ABSTRACT

The present application relates to decoding a video stream on a client device. A client application on the client device calls a decoding function implemented by a media player library, which includes a further call to a decoding function implemented by an operating system of the client device, and is modified to include a determination as to whether the video stream is encoded using a multi-layer coding scheme. If so, the video stream is processed to extract a base stream and an enhancement stream, the base stream is decoded using the further call to the decoding function implemented by the operating system, the encoded enhancement stream is (Continued)

Client Application 106

Media Player Library 108

Media Player Video Decoding Function 110

Operating System 102

Operating System Decoding Function 104

Client Device 100 decoded, the decoded enhancement stream is applied to the decoded base stream to generate decoded video stream data, and the decoded video stream data is returned to the decoding function implemented by the media player library.

16 Claims, 4 Drawing Sheets

(58) Field of Classification Search
USPC ...................................................... 375/240.25
See application file for complete search history.

(56) References Cited

U.S. PATENT DOCUMENTS

| | | | | |
|---|---|---|---|---|
| 2007/0260616 A1* | 11/2007 | Shen | ................ | H04N 21/85406 |
| 2013/0091297 A1 | 4/2013 | Minder et al. | | |
| 2015/0215632 A1 | 7/2015 | Choi et al. | | |
| 2016/0014413 A1* | 1/2016 | Sato | ........................ | H04N 19/46 |
| | | | | 375/240.12 |
| 2016/0014423 A1* | 1/2016 | Xu | ......................... | H04N 19/42 |
| | | | | 375/240.25 |
| 2016/0191929 A1* | 6/2016 | Hwang | .............. | H04N 21/4622 |
| | | | | 725/110 |
| 2018/0035126 A1* | 2/2018 | Lee | ...................... | H04N 19/503 |
| 2022/0191521 A1 | 6/2022 | Ferrara et al. | | |
| 2023/0100615 A1* | 3/2023 | Yuan | ..................... | G06T 3/4053 |
| | | | | 348/43 |

FOREIGN PATENT DOCUMENTS

| | | | |
|---|---|---|---|
| JP | 2016-154348 | A | 8/2016 |
| JP | 2016-534621 | A | 11/2016 |
| JP | 2022-526498 | A | 5/2022 |
| WO | 03/05190 | A1 | 1/2003 |
| WO | 2020/188273 | A1 | 9/2020 |

OTHER PUBLICATIONS

International Search Report and Written Opinion received for PCT Patent Application No. PCT/GB2021/053076, mailed on Mar. 2, 2022, 12 pages.

Meardi Guido et al, "MPEG-5 part 2: Low Complexity Enhancement Video Coding (LCEVC): Overview and performance evaluation", SPIE Proceedings; [Proceedings of SPIE ISSN 0277-786X], SPIE, US, vol. (0} 11510, Aug. 21, 2020 (Aug. 21, 2020), p. 115101C-115101C, XP06013371 DOi: 10.1117/12.2569246 / ISBN: 9781510636736.

Office Action received for Japanese Patent Application No. 2023-530582, mailed on Nov. 18, 2025, 6 pages (4 pages of English Translation and 2 pages of Original Document).

* cited by examiner

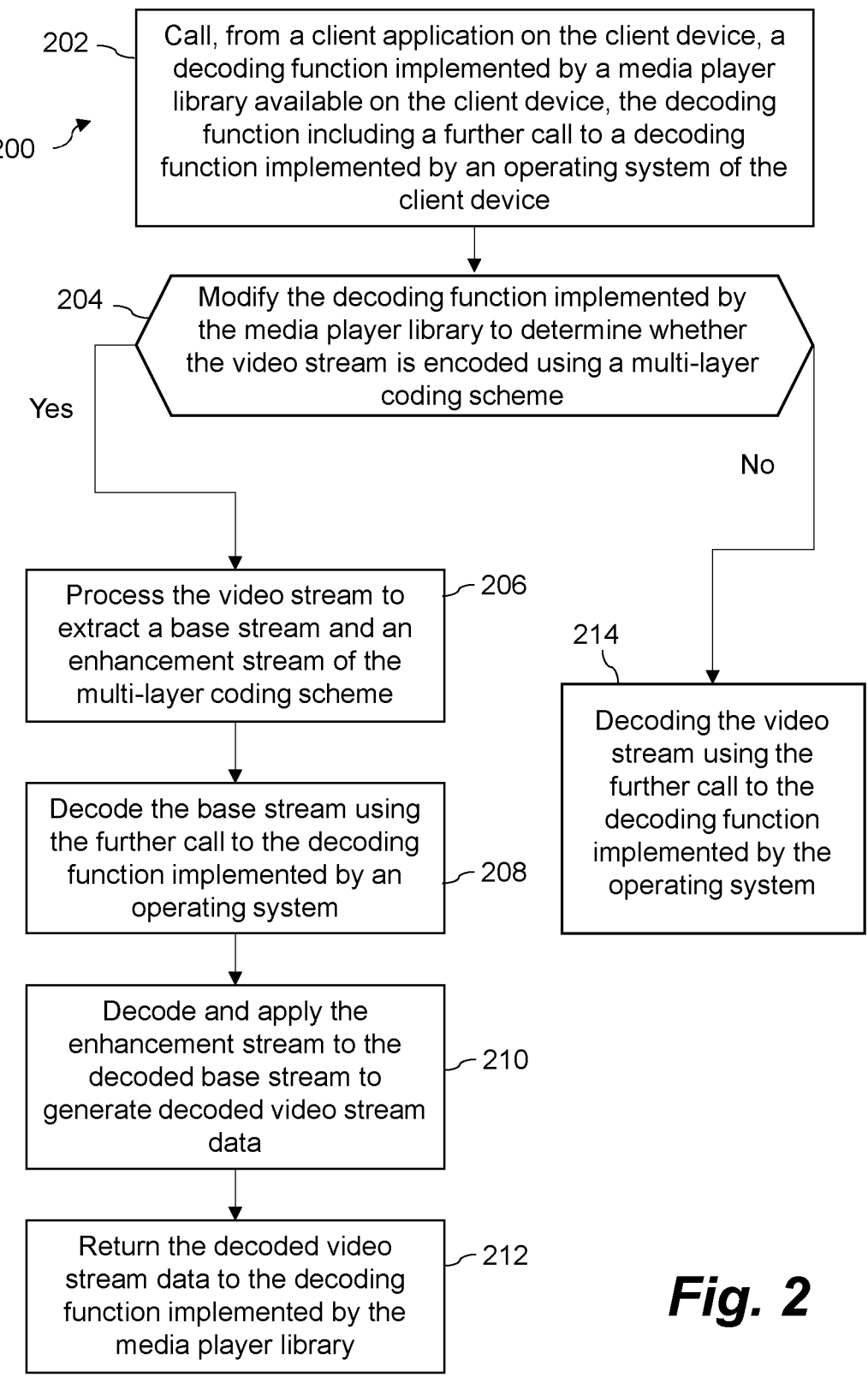

202 — Call, from a client application on the client device, a decoding function implemented by a media player library available on the client device, the decoding function including a further call to a decoding function implemented by an operating system of the client device

200

204 — Modify the decoding function implemented by the media player library to determine whether the video stream is encoded using a multi-layer coding scheme Yes No Process the video stream to extract a base stream and an enhancement stream of the multi-layer coding scheme — 206

Decode the base stream using the further call to the decoding function implemented by an operating system — 208

Decode and apply the enhancement stream to the decoded base stream to generate decoded video stream data — 210

Return the decoded video stream data to the decoding function implemented by the media player library — 212

214 — Decoding the video stream using the further call to the decoding function implemented by the operating system

402 — Client Application

404 — VLCKit

406 — libvlc

408 — libvlc modules process data

410 — Decoders

DECODING A VIDEO STREAM ON A CLIENT DEVICE

CROSS-REFERENCE TO RELATED APPLICATIONS

This application is a 371 US Nationalization of International Application No. PCT/GB2021/053076, filed Nov. 26, 2021, which claims priority to United Kingdom Patent Application No. 2018743.1, filed Nov. 27, 2020, the disclosures of which are hereby incorporated by reference herein in their entirety.

TECHNICAL FIELD

The present invention relates to methods, apparatuses, computer programs and computer-readable media for use in decoding a video stream on a client device.

BACKGROUND

Encoding and decoding of video content is a consideration in many known systems. Video content may be encoded for transmission, for example over a data communications network. When such video content is decoded, it may be desired to increase a level of quality of the video and/or recover as much of the information contained in the original video as possible. Many video coding formats, and their associated codecs, have been developed that attempt to achieve these desired characteristics, but often require significant software updates at the level of an operating system and/or hardware upgrades. Furthermore, to increase the quality of decoded video content, it is typically required to increase the complexity of the encoding and decoding procedures, which can increase power usage and increase the latency with which video content can be delivered.

SUMMARY

According to a first aspect of the present disclosure, there is provided a method of decoding a video stream on a client device. The method comprises calling, from a client application on the client device, a decoding function implemented by a media player library available on the client device, the decoding function implemented by the media player library including a further call to a decoding function implemented by an operating system of the client device; modifying the decoding function implemented by the media player library to include a determination as to whether the video stream is encoded using a multi-layer coding scheme; and responsive to determining that the video stream is encoded using a multi-layer coding scheme: processing the video stream to extract a base stream and an enhancement stream of the multi-layer coding scheme; decoding the base stream using the further call to the decoding function implemented by the operating system of the client device to generate a decoded base stream; decoding the encoded enhancement stream to generate a decoded enhancement stream; applying the decoded enhancement stream to the decoded base stream to generate decoded video stream data; and returning the decoded video stream data to the decoding function implemented by the media player library.

The client device may be an Apple® device. The operating system may be an operating system developed by Apple®, such as iOS, macOS or tvOS. The media player library may be libvlc. The multi-layer coding scheme may be MPEG-5 Part 2 Low Complexity Enhancement Video Encoding (LCEVC).

The decoding of the encoded enhancement stream may be performed using a multi-layer decoding function. The multi-layer decoding function may comprise a call to the operating system video decoding function with respect to the base stream, and may be configured to apply a decoded version of the enhancement stream to an output of the call to the operating system video decoding function to generate the decoded video stream data.

The method may be performed within a modified Video Toolbox module that supports multi-layer coding schemes such as LCEVC. A modified Video Toolbox module may be accessed via a VLCKit wrapper. The modified Video Toolbox module may be obtained by applying one or more patches to libvlc, e.g. by applying one or more LCEVC-specific patches to libvlc. The modification to the Video Toolbox module may comprise creating a generalisation of Apple®'s VTDecompressionSession object that provides capability of decoding video streams that are encoded using the LCEVC scheme.

The method may further comprise creating an instance of VLCKit. The encoded video stream may be demultiplexed into CMSampleBuffers. The method may further comprise determining whether the video stream is encoded using LCEVC. If it is determined that the video stream is encoded using LCEVC, the method may comprise extracting an LCEVC payload from the video stream. The LCEVC payload may be decoded using a VTDecompressionSession object. The method may further comprise reordering the decoded LCEVC payload to presentation order. An enhancement stream in the video stream may be decoded and applied to the decoded enhancement stream, e.g. the decoded LCEVC payload, to generate a decoded video stream. If it is determined that the video stream is not encoded using LCEVC, then the method may comprise decoding the video stream using the VTDecompressionSession object. In either case, the method may further comprise returning the decoded video stream as CVPixelBuffers. It may be determined whether the CVPixelBuffers are in the correct order. If it is determined that the CVPixelBuffers are not in the correct order, the CVPixelBuffers may be reordered to presentation order. The method may further comprise dequeuing the decoded video stream for presentation.

According to a second aspect of the present disclosure, there is provided a client device. The client device comprises an operating system comprising an operating system video decoding function; a client application for displaying a video; and a media player library comprising a media player video decoding function for use by the client application, the media player video decoding function comprising a call to the operating system video decoding function. The media player video decoding function is modified to include a wrapper for the operating system video decoding function that selectively implements a multi-layer decoding function on receipt of a video stream encoded using a multi-layer coding scheme, the video stream comprising a base stream and an enhancement stream, the multi-layer decoding function comprising a call to the operating system video decoding function with respect to the base stream, the multi-layer decoding function configured to apply a decoded version of the enhancement stream to an output of the call to the operating system video decoding function to generate decoded video stream data, and the multi-layer decoding function further configured to return the decoded video stream data to the media player video decoding function for use by the client application.

The client device may be an Apple® device. The operating system may be an operating system developed by Apple®, such as iOS, macOS or tvOS. The media player library may be libvlc. The multi-layer coding scheme may be LCEVC.

The media player video decoding function may include a modified Video Toolbox module that supports multi-layer coding schemes such as LCEVC. A modified Video Toolbox module may be accessed via a VLCKit wrapper. The modified Video Toolbox module may be obtained by applying one or more patches to libvlc, e.g. by applying one or more LCEVC-specific patches to libvlc. The modification to the Video Toolbox module may comprise creating a generalisation of Apple®'s VTDecompressionSession object that provides a capability of decoding video streams that are decoded using the LCEVC scheme.

The client device may further comprise a demultiplexer to demultiplex the encoded video stream into CMSampleBuffers. The modified Video Toolbox module may determine whether the video stream is encoded using LCEVC. If it is determined that the video stream is encoded using LCEVC, an LCEVC payload may be extracted from the video stream. The LCEVC payload may be decoded using a VTDecompressionSession object. In this case, the modified Video Toolbox module may reorder the decoded LCEVC payload to presentation order. An enhancement stream in the video stream may be decoded and applied to the decoded enhancement stream, e.g. to the decoded LCEVC payload, to generate a decoded video stream. If it is determined that the video stream is not encoded using LCEVC, the video stream may be decoded using the VTDecompressionSession object. In either case, the decoded video stream may be returned as CVPixelBuffers. It may be determined whether the CVPixelBuffers are in the correct order. If it is determined that the CVPixelBuffers are not in the correct order, the CVPixelBuffers may be reordered to presentation order. The decoded video stream may be dequeued for presentation.

According to a third aspect of the present disclosure, there is provided a computer-readable storage medium storing instructions executable by at least one processor to perform the method of the first aspect.

Further features will become apparent from the following description, given by way of example only, which is made with reference to the accompanying drawings.

BRIEF DESCRIPTION OF THE DRAWINGS

FIG. 2 is a flow diagram of a method of decoding a video stream on a client device according to examples.

DETAILED DESCRIPTION

Encoding of a digital signal, also known as compression, is the process of generating a representation of the digital signal using fewer bits of information than is used to represent the original signal, e.g. an original video. The encoding process may be described as lossy when information is lost between the original signal and in the generated representation. Alternatively, the encoding process may be described as lossless when no information is lost between the original signal and in the generated representation. Unencoded digital signals, e.g. representing video content, require a high rate of data transmission and so are often encoded.

In the encoding and decoding of digital video content, there is typically a trade-off between increased video quality and encoding and decoding complexity. However, with the advent of MPEG-5 Part 2 Low Complexity Enhancement Video Encoding (LCEVC), details of which can be found in WO/2020/188273A1, and the associated standard specification documents including the Draft Text of ISO/IEC DIS 23094-2 Low Complexity Enhancement Video Coding published at MPEG 129 meeting in Brussels, held Monday, 13 Jan. 2020 to Friday, 17 Jan. 2020, which are incorporated herein by reference, it is now possible to improve video quality and reduce complexity of the codec. This is achieved by combining a base stream encoded using a base codec (e.g. Advanced Video Coding (AVC), High Efficiency Video Coding (HEVC), or any other present or future codec), with an enhancement stream comprising at least one enhancement level of coded data.

Combining the base stream with the enhancement stream allows the base stream to be transmitted at a lower resolution, reducing bandwidth requirements on a data communications network. Alternatively, the video content can be transmitted at a higher resolution for the same bandwidth to produce a higher quality video than is possible without combining the base stream with an enhancement stream.

Although this enables these advantages with regard to video quality and reduced complexity, there remains a need for an approach for implementing LCEVC on client devices, and in particular for integrating the coding scheme with media player functionality and operating system video decoding functions of such devices.

Figure 1:
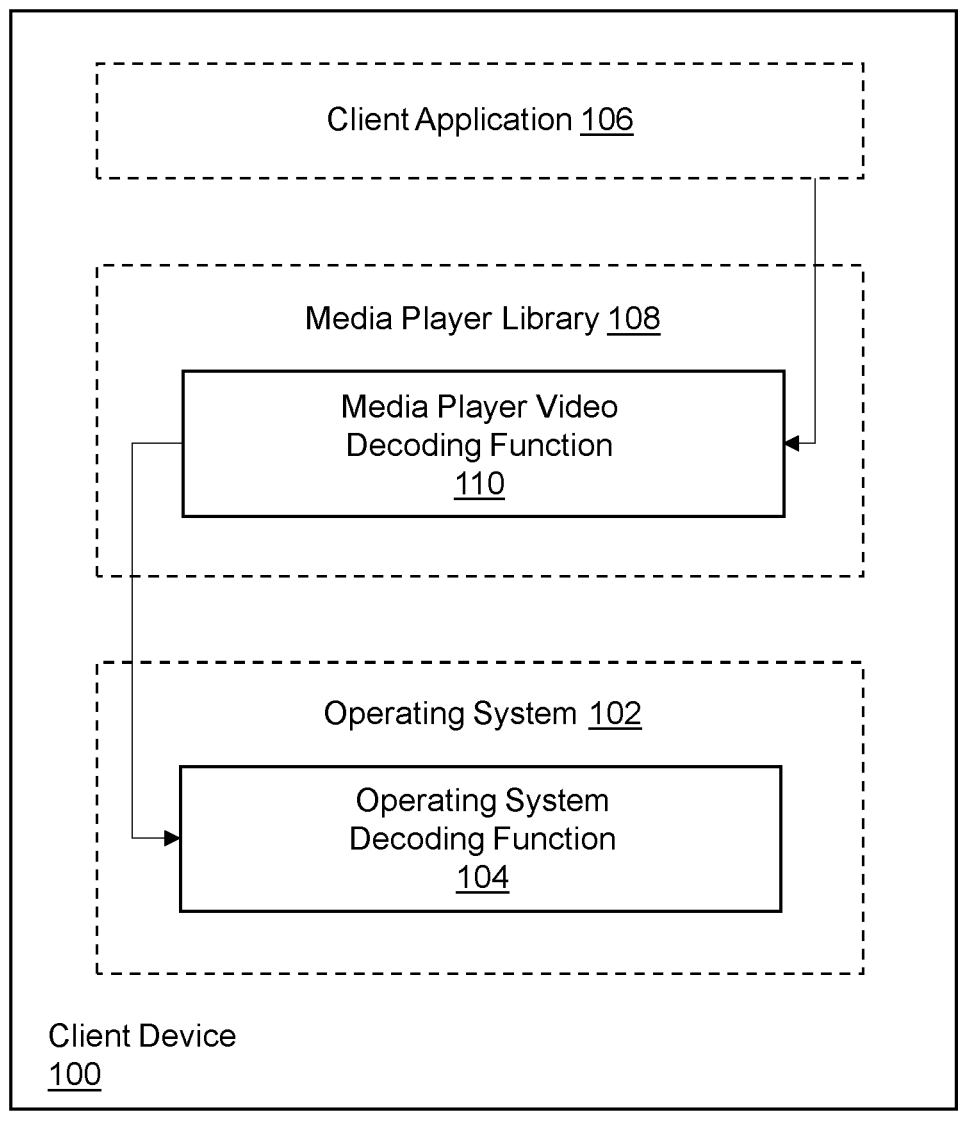
FIG. 1 is a schematic diagram of an example system for decoding a video stream on a client device.

FIG. 1 is a schematic diagram of an example client device 100. The client device may be a mobile device, such as any generation of iPhone®, iPad®, or another computing device such as a laptop or desktop computer. The client device typically comprises appropriate hardware components to facilitate data processing, such as one or more processors, memory, a user interface (UI) and/or at least one graphics processing unit (GPU).

The client device 100 comprises an operating system 102, which is for example system software of the client device 100 that supports basic functionality of the client device 100, e.g. involving the management of hardware and software resources of the client device 100. The operating system 102 comprises an operating system video decoding function 104 for use in decoding encoded video content. The operating system video decoding function 104 may be referred to as a decoding function implemented by the operating system. As the operating system 102 comprises its own operating system video decoding function 104, the operating system 102, for example, has native support for decoding video streams encoded using certain codecs. When the client device is an Apple® device, the operating system may be a corresponding version of an operating system developed by Apple Inc. of Cupertino, United States. For example, when the client device is iPhone®, the operating system may be any version of iOS. In another example, the client device may be any Apple® Mac® device, in which case the operating system may be any version of macOS. In a further example, the client device may be an Apple® TV device, in which case the operating system may be any version of tvOS.

The client device 100 further comprises a client application 106 for displaying video. The client application 106 may be any software application on the client device 100 which is capable of use in rendering or otherwise displaying video on a display coupled to or incorporated within the client device 100. It is common for client applications to include video content embedded or otherwise included within the application itself. One example may be a video tutorial within the client application 106 explaining to a user how the client application 106 is used. Another example is a social media application that allows users to view video content uploaded by other users of the social media application.

The client device 100 also comprises a media player library 108, which in this example provides at least some of the resources to display the video content in the client application. The media player library 108 is associated with a media player of the operating system 102, for playing media such as videos.

The media player library 108 comprises a media player video decoding function 110, which may be referred to as a decoding function implemented by the media player library, for use by the client application 106 in decoding encoded video content (in this case, in conjunction with the operating system video decoding function 102). The media player video decoding function 110 comprises a call to the operating system video decoding function 102. This allows the media player library 108 to access the decoding capabilities of the operating system 102.

The media player video decoding function 110 is modified to include a wrapper for the operating system video decoding function 104 that selectively implements a multi-layer decoding function on receipt of a video stream encoded using a multi-layer coding scheme. In this way, the multi-layer decoding function can be utilised for certain videos (such as those encoded using the multi-layer coding scheme). A different decoding function can be used for other videos. For example, a legacy decoding function, e.g. corresponding to the media player video decoding function 110 without modification, can be used for videos encoded using a different scheme than the multi-layer coding scheme.

In examples, a video stream encoded using a multi-layer coding scheme comprises a base stream and an enhancement stream. The base stream is, for example, a down-sampled source signal encoded using a base encoder, also known as a base compressor, and decodable by a decoder, also known as a decompressor. The base encoder can be any base encoder, such as Advanced Video Coding (AVC), High Efficiency Video Coding (HEVC), VP9, MPEG-5 Essential Video Coding (EVC), Versatile Video Coding (VVC) and AOMedia Video 1 (AV1) encoders. Using existing base encoders (and decoders) as part of the encoding (and decoding) procedure ensures that systems that are not capable of decoding multi-layer video content can still decode the base stream using the existing base codec. This means that no updates to hardware are required to decode the video stream encoded using the multi-layer coding scheme, and future base codecs may also be used without further hardware upgrades, should the hardware of a system such as the client device 100 be upgraded to become compatible with the future base codec.

The operating system video decoding function 104 is arranged to decode the base stream. For example, the operating system video decoding function 104 may comprise at least one of an Advanced Video Coding (AVC), High Efficiency Video Coding (HEVC), VP9, MPEG-5 Essential Video Coding (EVC), Versatile Video Coding (VVC), and AOMedia Video 1 (AV1) decoder. The operating system video decoding function 104 may comprise a hardware decoder, so that the operating system video decoding function 104 can utilise hardware acceleration for decoding the base stream. This can reduce the number of computations performed by a central processing unit (CPU) of the client device 100 by offloading the decoding to hardware. Hardware acceleration may provide a more efficient way of implementing a decoding process which involves computationally intensive processes such as motion compensation and computing an inverse discrete cosine transform, for example.

The enhancement stream comprises an encoded set of residuals which correct or otherwise enhance the base stream. There may be multiple levels of enhancement data in a hierarchical structure. The enhancement stream may be encoded using a dedicated encoder configured to generate an enhancement stream from uncompressed full resolution video.

An LCEVC-enhanced stream is an example of a video stream encoded using a multi-layer coding scheme. In this case, the video stream is encoded by an LCEVC encoder; in particular, the base stream is encoded using a base encoder and an LCEVC encoder uses the output of a base decoder to generate the enhancement stream. For example, an encoded base stream may be decoded using the base decoder and frames from the decoded base stream may be accessed by the LCEVC encoder along with original input frames (pre-base encoding) to generate one or more layers of residual data for encoding as one or more layers of the enhancement stream. Examples herein may also be applied to video streams encoded using other multi-layer coding schemes, though.

The media player video decoding function 110 is modified to include a wrapper for the operating system video decoding function 104. This allows the media player video decoding function 110 to call the operating system video decoding function 104, and utilise the resources of the operating system video decoding function 104. The resources of the operating system video decoding function 104 can be used by the media player video function 110 to selectively decode video streams encoded by the multi-layer coding scheme using a multi-layer decoding function, for example when it is determined that a received encoded video stream is encoded using a multi-layer decoding function.

The multi-layer decoding function comprises a call to the operating system video decoding function 104 with respect to the base stream. As discussed above, the operating system video decoding function 104 is operable to decode encoded base streams. The call from the multi-layer decoding function to the operating system video decoding function 104, thus allows the base stream of the video stream encoded by the multi-layer coding scheme to be decoded. In other words, the native decoding capabilities of the operating system 102 can be utilised to decode the base stream.

In examples, the multi-layer decoding function is also operable to decode the enhancement stream of the video stream encoded by the multi-layer coding scheme to generate a decoded version of the enhancement stream. In this way, modifying the media player video decoding function 110 to include the wrapper for the operating system video decoding function 104 to selectively implement the multi-layer decoding function allows the enhancement stream to be decoded. This for example increases the functionality of the media player video decoding function 110 by allowing video streams encoded using more advanced codecs, such as multi-layer coding schemes, to be decoded. In examples, the functionality of the media player video decoding function 110 can be increased in this way without altering the underlying hardware of the client device 100, by exploiting existing functionality of the media player library 108 and the operating system 102 in a straightforward and flexible manner. For example, the wrapper for the operating system video decoding function 104 can be changed straightforwardly, e.g. so that the multi-layer decoding function is operable to decode video encoded using a different multi-layer decoding scheme, without changing underlying functionality of the media player library 108 and/or the operating system 102.

In these examples, the multi-layer decoding function then applies the decoded version of the enhancement stream to an output of the call to the operating system video decoding function 104 to generate decoded video stream data. This combines the decoded base stream and the decoded version of the enhancement stream into a single decoded video stream, which is typically of higher quality than the decoded base stream. For example, the decoded version of the enhancement stream may comprise one or more layers of residual data that are added to the decoded base stream to generate the output decoded video stream.

The multi-layer decoding function is further configured to return the decoded video stream data to the media player video decoding function 110 for use by the client application 106. For example, the decoded video stream data can be displayed within the client application 106, e.g. using a display coupled to the client device 100.

In some examples, the multi-layer decoding function reorders frames of the decoded base stream. This may be the case when the order of the frames in the decoded base stream differs from the order of the associated uncompressed full resolution video. This can happen when decoding the base stream causes the frames of the decoded base stream to be reordered. In examples in which an enhancement stream is lacking, a base stream may be the only video stream within received video stream data, and so reordering of frames may be the final step before the video content is displayed. However, in the present example, the decoded base stream is combined with the decoded enhancement stream. Consequently, it may be necessary to reorder the frames of the decoded base stream after the base stream is decoded to ensure that the associated decoded version of the enhancement stream is applied to the decoded base stream to generate the final decoded video stream data and then displayed in the appropriate order.

In an example, at least one internal method of the operating system video decoding function 104 is not available to at least one of the client application 106 and the media player library 108, and may therefore be considered to be a restricted function. For example, access to at least one underlying routine of the operating system video decoding function 104 may be restricted by a developer of the operating system 102. However, the client application 106 and/or the media player library 108 may call the operating system video decoding function 104, regardless of such access to the underlying routines. In other words, the client application 106 and/or the media player library 108 can access the functionality provided by the operating system video decoding function 104 (which may involve calling an internal method of operating system video decoding function 104) without being able to separately access the functionality provided by the internal method itself.

The process by which a video stream encoded using a multi-layer coding scheme is decoded within a client device, such as the client device 100 shown in FIG. 1, will now be described in further detail with respect to method 200.

At block 202 of FIG. 2, a decoding function implemented by a media player library available on the client device is called from a client application on the client device. As described above, a client application may include video content visible to a user of the client device. To display the video content in the client application, the client application includes a call to the media player library. The media player library comprises at least some of the resources required to display video content within the client application.

The decoding function implemented by a media player library includes a further call to a decoding function implemented by an operating system of the client device. The operating system comprises the decoding function implemented by the operating system, which, for example, comprises resources to decode encoded a base stream of a video stream.

At block 204, the decoding function implemented by the media player library is modified to include a determination as to whether the video stream is encoded using a multi-layer coding scheme. As discussed above, the multi-layer coding scheme may be an LCEVC scheme. The determination may involve detecting at least one property of the video stream. For example, the video stream may comprise metadata indicating that the video stream is encoded using a multi-layer coding scheme. The determination may alternatively or additionally involve detecting whether the video stream comprises an enhancement stream.

If it is determined that the video stream is encoded using a multi-layer coding scheme, the method 200 proceeds to block 206, at which the video stream is processed to extract a base stream and an enhancement stream of the multi-layer coding scheme. This can be performed using a suitable signal extractor, such as a dedicated signal extractor or a signal extractor forming part of another logical component of the client device.

At block 208, the base stream is decoded using a further call to the decoding function implemented by the operating system. In other words, the native resources of the operating system can be used to decode the base stream.

At block 210, the enhancement stream is decoded. The enhancement stream may be decoded by the decoding function implemented by the media player as modified at block 204. The decoded enhancement stream is then applied to the decoded base stream to generate decoded video stream data. For example, the enhancement stream may be decoded and applied to the decoded base stream using a call to a multi-layer decoder library that includes a suitable decoding function for decoding multi-layer video streams. The modification of the decoding function implemented by the media player at block 204 for example includes modifying the decoding function implemented by the media player to provide access to the multi-layer decoder library.

At block 212, the decoded video stream data is returned to the decoding function implemented by the media player library. The client application can then receive and display the decoded video stream within the client application.

If, however, it is determined that the video stream is not encoded using the multi-layer coding scheme, the method 200 proceeds to block 214. At block 214 of the method 200, the video stream is decoded using the further call to the decoding function implemented by the operating system. The modification of the decoding function implemented by the media player library does not affect the capability of the decoding function of the operating system to decode the base stream. Consequently, if the encoded video stream is not encoded using the multi-layer coding scheme such as LCEVC, then the decoding function implemented by the operating system can decode the encoded video stream as if no modification has been made to the decoding function implemented by the media player. The encoded video stream can then be passed to the decoding function implemented by the media player and decoded to obtain a decoded video stream. The decoded video stream can consequently be passed to, and displayed by, the client application. Therefore, the method 200 allows encoded video streams to be decoded, whether they are encoded using a base codec only or a multi-layer coding scheme. The method 200 provides an efficient process of decoding encoded video that exploits existing functionality within the operating system, for example without changing hardware of the operating system.

After the decoded video stream data is returned to the decoding function implemented by the media player library (e.g. at block 212 of FIG. 2, or after block 214 of FIG. 2 has been performed), the decoding function implemented by the media player library may reorder frames of the decoded video stream data. This may be the case if decoding the base stream or applying the decoded enhancement stream to the decoded base stream to generate decoded video stream data causes the order of frames in the decoded video stream to differ from the order of frames in the associated uncompressed full resolution video. Reordering the frames of the decoded video stream data ensures that displayed frames of the video stream are displayed in the correct order when played back. In some cases, a similar reordering may alternatively be performed after the base stream is decoded at block 208 of FIG. 2.

In an example, modifying the decoding function at block 204 of the method 200 of FIG. 2 comprises applying a patch to the media player library. The patch, for example, improves the functionality of the media player library to allow it to support decoding of video streams encoded using a multi-layer coding scheme, e.g. using operating system resources such as the decoding function implemented by the operating system. Applying the patch to the media player library may comprise modifying a file comprising computer program code for the decoding function implemented by the media player library and adding a further file for the decoding function implemented by the operating system of the client device.

In some cases, modifying the decoding function implemented by the media player library additionally includes applying a wrapper to the decoding function implemented by the operating system (e.g. as described with reference to FIG. 1), to selectively implement a multi-layer decoding function (e.g. to perform blocks 204 to 212 of FIG. 2). The wrapper for example allows the decoding function implemented by the operating system to be used to perform the multi-layer decoding function. For example, the wrapper may act as an interface to the decoding function implemented by the operating system so as to decode the base stream (e.g. using the decoding function implemented by the operating system) and the enhancement stream (e.g. using a call to a multi-layer decoder library), and to combine the decoded base stream and the decoded enhancement stream to obtain the decoded video stream data (which may be performed using the call, or a further call, to the multi-layer decoder library).

The method 200 of FIG. 2 may be implemented using appropriately configured software or hardware of a client device. Alternatively, instructions to implement the method 200, when processed by one or more processors (e.g. of a suitable client device), may be stored on a computer-readable storage medium.

Figure 3:
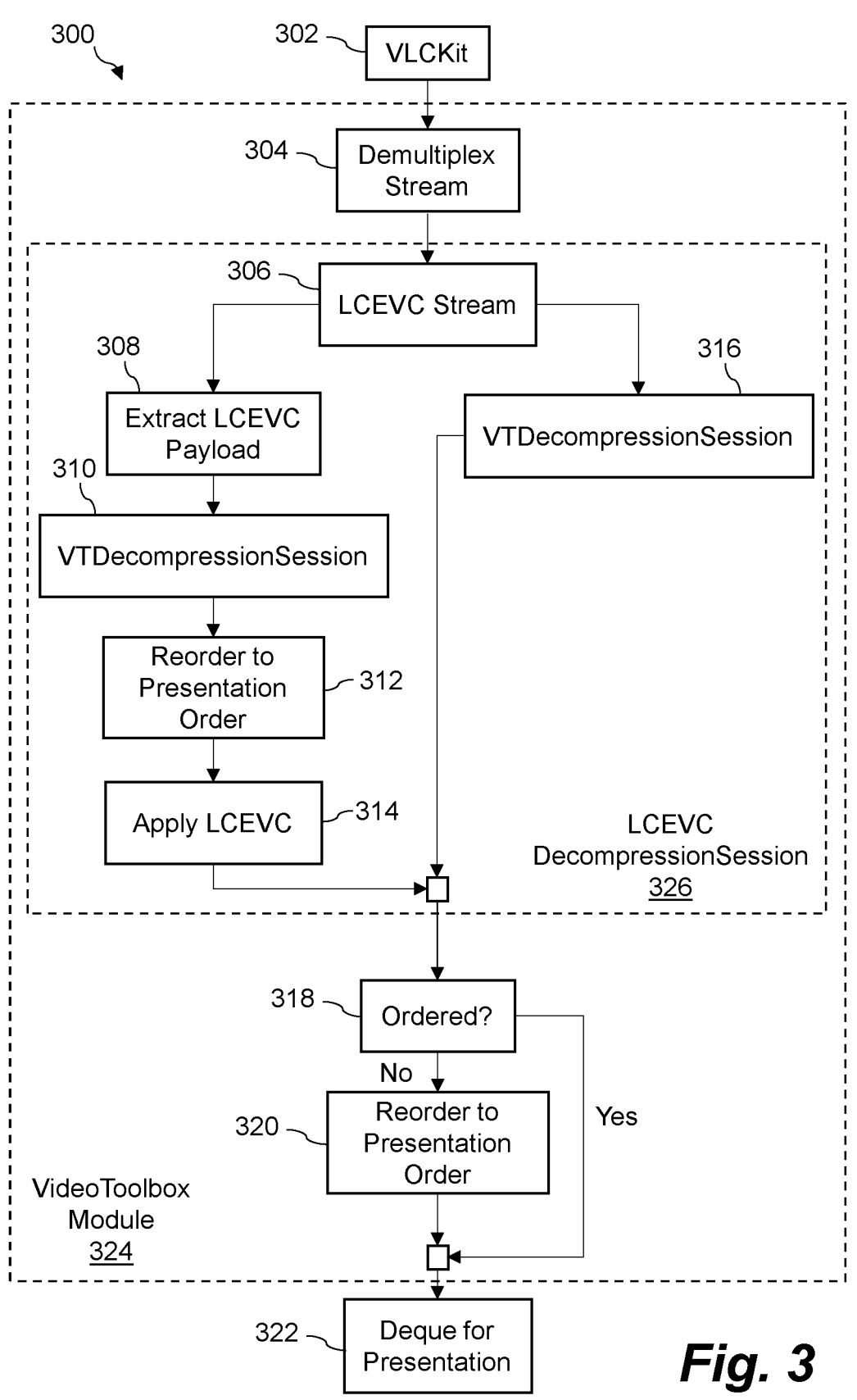
FIG. 3 is a flow diagram of a method of decoding a video stream on a client device according to further examples.

FIG. 3 shows a method 300 of an example implementation of the method 200 in which the operating system is an operating system developed by Apple Inc. of Cupertino, United States, such as iOS, macOS and tvOS, and the multi-layer coding scheme is LCEVC. The method 300 describes a process within a Video Toolbox module 324. The Video Toolbox module 324 of FIG. 3 is a modified version of a Video Toolbox function, which is accessed via a VLCKit wrapper. The Video Toolbox function is a media library function for use with VT—Video Toolkit—functions with the Apple® developed operating system. VLCKit is a wrapper for an external interface of libvlc, which is the core library of the VLC media player that may be used with Apple® devices, where libvlc may be implemented as an executable file that provides a system-level library. Unmodified, the Video Toolbox module 324 allows the use of a hardware accelerated framework (the Video Toolkit from Apple® that forms part of the Apple® developed operating system) that decodes encoded video streams, such as the base streams previously discussed. The present example modifies the Video Toolbox module 324 to allow the framework may be modified to support multi-layer coding schemes (in this case, LCEVC). The modification may be implemented by applying one or more LCEVC-specific patches to libvlc, e.g. by arranging the patch(es) in the appropriate folder prior to building an VLCkit instance. This provides the necessary modifications in order to allow the Video Toolbox to decode LCEVC-enhanced video streams.

The modification involves the creation of an LCEVC DecompressionSession 326, which is a generalisation of the Apple® VTDecompressionSession object in the unmodified Video Toolbox module, that provides the capability of decoding video streams that are encoded using the LCEVC scheme. In this example, the LCEVC DecompressionSession 326 also allows video streams encoded using other schemes (such as single layer coding schemes) to be decoded.

The VTDecompressionSession is a session object provided by the Video Toolbox that manages decompression of video data and is an operating system video decoding function inbuilt to Apple® developed operating systems to decode base streams. In the LCEVC DecompressionSession 326, the VTDecompressionSession is utilised to decode the base stream, as in the unmodified Video Toolbox module. The LCEVC DecompressionSession 326 further comprises additional structure required to decode LCEVC encoded streams and is described with reference to the method 300 of FIG. 3.

The method 300 involves creating an instance of VLCKit 302. In this case, the media player is VLC, libvlc is the media player library, accessible via the VLCKit 300 wrapper. The libvlc library includes a media player video decoding function.

At block 304, a received encoded video stream is demultiplexed into CMSampleBuffers. CMSampleBuffers are objects comprising samples of video that are used to move media sample data through a media pipeline. The video stream is then processed by the LCEVC DecompressionSession 326 module.

At block 306, it is determined whether the video stream is encoded using LCEVC, similar to block 204 of the method 200. If it is determined that the video stream is encoded using LCEVC, then the method 300 proceeds to block 308, wherein a LCEVC payload is extracted from the video stream. The LCEVC payload is the base stream of the LCEVC stream, encoded using a base codec.

At block 310, the base video stream is decoded using the VTDecompressionSession object. The decoding of the base video stream may cause the order of frames of the decoded base video stream to differ from those in the associated unencoded full resolution video. Therefore, the method 300 involves reordering 312 the decoded base video stream into presentation order. The presentation order corresponds to the order in which frames in the final video content will be displayed.

At block 314, an enhancement stream in the video stream encoded using LCEVC, which is extracted at block 308, is decoded and applied to the decoded base video stream to generate a decoded video stream. Block 314 of the method 300 for example involves a call to a multi-layer decoder library, as discussed further with reference to FIG. 4, to access at least one suitable function to implement the LCEVC decoding process.

If, at block 306, it is determined that the video stream is not encoded using LCEVC, then the VTDecompressionSession 316 object is used to decode the video stream, as in the unmodified Video Toolbox module case.

After either block 314 or 316, the decoded video stream is returned as CVPixelBuffers. A CVPixelBuffer is an image buffer that holds pixels in memory. At block 318, it is determined whether the CVPixelBuffers are in the correct order for display. If the CVPixelBuffers are not in the correct order, then the method 300 proceeds to block 320, in which the CVPixelBuffers are reordered so that each frame is ordered correctly, such that the video stream provides a representation of the original video, as in the unmodified Video Toolbox module case.

If, at block 318, it is determined that the CVPixelBuffers are correctly ordered, then the method 300 proceeds to block 322, in which the decoded video stream is dequeued for presentation.

Figure 4:
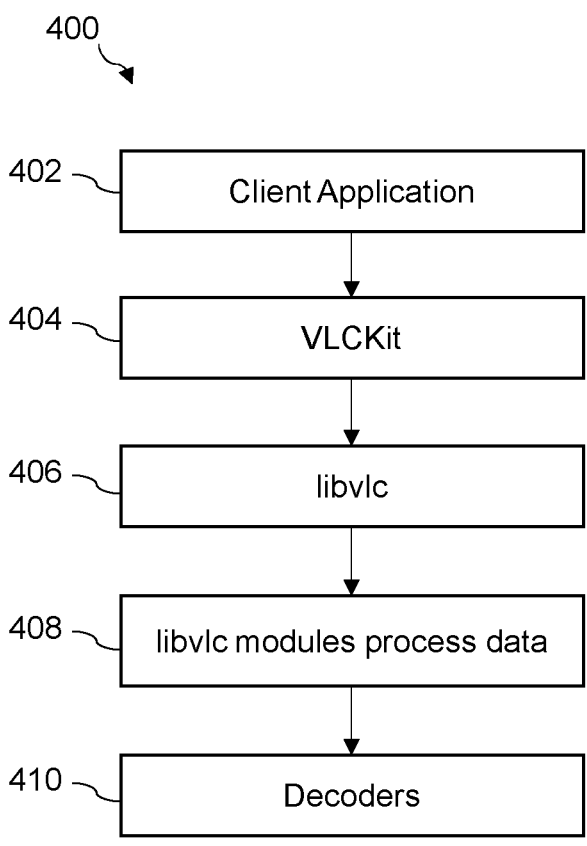
FIG. 4 is an example computer system level hierarchy for decoding video.

An example of how LCEVC streams are decoded, e.g. as performed at block 314 of FIG. 3, is shown in FIG. 4. FIG. 4 shows schematically a computer system level hierarchy 400 of components for displaying video content on a client device such as the client device 100 of FIG. 1. At the highest level is the client application 402. This is the software application that a video will be displayed within. A user may view the video on a display coupled to the client device. The client application 402 uses an instance of VLCKit 404 to interface with libvlc 406, the core library of the VLC media player. The core libvlc library may comprise executable computer program code that allows media player functionality to be incorporated into the client application 402. In the present case, libvlc 406 is modified to include one or more patches that allow libvlc to support LCEVC decoding. This may comprise modifying one or more files and/or computer program code portions that implement or operate with libvlc 406. The modified modules 408 within libvlc 406 process data associated with the encoded video stream and supply the relevant components of the video stream to respective decoders 410, which for example included an operating system video decoding function and a multi-layer decoding function (e.g. provided by a multi-layer decoder library). For example, the base stream may be decoded by the operating system video decoding function, as described above, while the enhancement stream may be decoded using libvlc, modified with the one or more patches (which for example corresponds to a multi-layer decoder library). The decoded video content may then be received by the client application 402 for display.

The above examples are to be understood as illustrative examples. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

The invention claimed is:

1. A method of increasing functionality of a media player video decoding function without altering underlying hardware of a client device that implements the media player video decoding function, the method comprising:
    accessing an operating system video decoding function of an operating system of the client device;
    accessing the media player video decoding function, which is included as a part of a media player library on the client device;
    modifying the media player video decoding function to include a wrapper that is applied to the operating system video decoding function, wherein the wrapper allows the media player video decoding function to call the operating system video decoding function, thereby increasing the functionality of the media player video decoding function
    determining whether a video stream is encoded using a multi-layer coding scheme; and
    responsive to determining that the video stream is encoded using the multi-layer coding scheme:
    processing the video stream to extract a base stream and an enhancement stream of the multi-layer coding scheme;
    causing the media player video decoding function to use the wrapper to call the operating system video decoding function and tasking the operating system video decoding function to decode the base stream to generate a decoded base stream;
    causing the media player video decoding function to decode the encoded enhancement stream to generate a decoded enhancement stream;
    applying the decoded enhancement stream to the decoded base stream to generate decoded video stream data; and
    returning the decoded video stream data to the media player video decoding function implemented by the media player library.

2. The method of claim 1, further comprising:
    responsive to determining that the video stream is not encoded using the multi-layer coding scheme, decoding the video stream using the operating system video decoding function.

3. The method of claim 1, wherein the media player video decoding function reorders frames of the decoded video stream data returned to the media player video decoding function, which is implemented by the media player library, for display.

4. The method according to claim 1, wherein the client device is a mobile device.

5. The method of claim 1, wherein the operating system video decoding function is hardware accelerated.

6. The method according to claim 1, wherein the operating system of the client device is one of iOS, macOS, and tvOS.

7. The method according to claim 1, wherein the multi-layer coding scheme is a Low Complexity Enhancement Video Coding (LCEVC) scheme.

8. The method of claim 1, wherein modifying the media player video decoding function comprises applying a patch to the media player library.

9. The method of claim 8, wherein applying the patch to the media player library comprises modifying a file comprising computer program code for the media player video decoding function and adding a further file for the operating system video decoding function.

10. A client device comprising:

an operating system comprising an operating system video decoding function;

a client application for displaying a video; and a media player library comprising a media player video decoding function for use by the client application, wherein:

wherein the media player video decoding function is modified to include a wrapper that is applied to the operating system video decoding function, which selectively implements a multi-layer decoding function on receipt of a video stream encoded using a multi-layer coding scheme, the wrapper allows the media player video decoding function to call the operating system video decoding function, such that a functionality of the media player video decoding function is increased as a result of the wrapper, the video stream includes a base stream and an enhancement stream, the media player video decoding function uses the wrapper to call to the operating system video decoding function with respect to the base stream, the media player video decoding function is configured to decode the enhancement stream and to apply a decoded version of the enhancement stream to an output of the call to the operating system video decoding function to generate decoded video stream data, and the multi-layer decoding function is configured to return the decoded video stream data to the media player video decoding function for use by the client application.

11. The client device of claim 10, wherein the multi-layer coding scheme is a Low Complexity Enhancement Video Coding (LCEVC) scheme.

12. The client device of claim 10, wherein the multi-layer decoding function reorders frames of the decoded base stream for display.

13. The client device of claim 10, wherein internal methods of the operating system video decoding function are not available to at least one of the client application and the media player library.

14. The client device of claim 10, wherein the operating system video decoding function is hardware accelerated.

15. A non-transitory computer-readable storage medium storing instructions executable by at least one processor to perform the following operations:

accessing an operating system video decoding function of an operating system of a client device;

accessing a media player video decoding function, which is included as a part of a media player library on the client device;

modifying the media player video decoding function to include a wrapper that is applied to the operating system video decoding function, wherein the wrapper allows the media player video decoding function to call the operating system video decoding function, thereby increasing the functionality of the media player video decoding function;

determining whether a video stream is encoded using a multi-layer coding scheme; and responsive to determining that the video stream is encoded using the multi-layer coding scheme:

processing the video stream to extract a base stream and an enhancement stream of the multi-layer coding scheme;

causing the media player video decoding function to use the wrapper to call the operating system video decoding function and tasking the operating system video decoding function to decode the base stream to generate a decoded base stream;

causing the media player video decoding function to decode the encoded enhancement stream to generate a decoded enhancement stream;

applying the decoded enhancement stream to the decoded base stream to generate decoded video stream data; and returning the decoded video stream data to the media player video decoding function implemented by the media player library.

16. The method of claim 1, wherein the method further includes:

changing the wrapper applied to the operating system video decoding function to cause the media player video decoding function to first be operable against the multi-layer coding scheme to subsequently be operable against a second multi-layer coding scheme, which is different from said multi-layer coding scheme, without changing underlying functionality of the media player library.

* * * * *